United States Patent [19]
Okamoto et al.

[11] Patent Number: 5,752,988
[45] Date of Patent: May 19, 1998

[54] METHOD FOR PRODUCING ELECTRODE UNIT FOR FUEL CELL

[75] Inventors: Takafumi Okamoto; Ichiro Tanaka; Hideo Kato; Norimasa Kawagoe; Akio Yamamoto, all of Wako, Japan

[73] Assignee: Honda Giken Kogyo Kabushiki Kaisha, Tokyo, Japan

[21] Appl. No.: 794,329

[22] Filed: Feb. 3, 1997

[30] Foreign Application Priority Data

Feb. 5, 1996 [JP] Japan .................. 8-019044
Jan. 20, 1997 [JP] Japan .................. 9-007899

[51] Int. Cl.$^6$ .................................................. H01M 8/10
[52] U.S. Cl. ................................................ 29/623.5; 429/33
[58] Field of Search ............................. 29/623.5; 429/33

[56] References Cited

U.S. PATENT DOCUMENTS

| | | | |
|---|---|---|---|
| 4,338,163 | 7/1982 | Rittenhouse | 29/623.5 |
| 5,164,060 | 11/1992 | Eisman et al. | 204/282 |
| 5,272,017 | 12/1993 | Swathirajan et al. | 429/33 |
| 5,470,448 | 11/1995 | Molter et al. | 204/252 |
| 5,492,543 | 2/1996 | Lim | 29/623.5 |

FOREIGN PATENT DOCUMENTS

| | | |
|---|---|---|
| 389 020 B | 8/1986 | Austria . |
| 0 560 295 A1 | 9/1993 | European Pat. Off. ............ 8/10 |
| 0 569 062 A2 | 11/1993 | European Pat. Off. . |
| 3334330 A1 | 4/1985 | Germany . |
| 7-29576 | 1/1995 | Japan . |
| WO 94/25993 | 11/1994 | WIPO . |

OTHER PUBLICATIONS

Search Report, Dated Jun. 1997.
English language of Patent Abstract of JP 7-029576, Jan. 1995.

*Primary Examiner*—John S. Maples
*Attorney, Agent, or Firm*—Lyon & Lyon LLP

[57] ABSTRACT

The present invention makes it possible to remove an organic solvent in an electrode paste and fix an ion-conductive component while maintaining a desired moisture content. Specifically, a sheet of carbon paper applied with the electrode paste is horizontally held in a tank which comprises a drying apparatus. Water in the tank is brought to the boil by the aid of a first heater. Accordingly, the organic solvent in the electrode paste is removed, and the ion-conductive component is fixed, while forcedly humidifying the carbon paper and the electrode paste with steam.

12 Claims, 7 Drawing Sheets

METHOD FOR PRODUCING ELECTRODE UNIT FOR FUEL CELL

BACKGROUND OF THE INVENTION

1. Field of the Invention

The present invention relates to a method for producing an electrode unit to be used, for example, for a fuel cell having an ion exchange membrane.

2. Description of the Related Art

A fuel cell of the ion exchange membrane type (PEFC) has been developed and gradually put to practical use for various applications. Such a fuel cell is constructed, for example, by stacking a plurality of electrode units interposed between separators, each of the electrode units comprising an anode and a cathode arranged in an opposed manner with an ion exchange membrane interposed therebetween.

In general, such an electrode unit is constructed as an integrated unit comprising an ion exchange membrane which is a cation exchange membrane composed of polystyrene having a sulfonic acid group, an electrode catalyst layer including an electrode catalyst such as carbon-supported noble metal (for example, Pt) and an ion-conductive component such as Nafion (trademark, produced by du Pont, fluorine-containing ion-exchanger), and a gas diffusion layer such as porous carbon paper (see Japanese Laid-Open Patent Publication No. 7-29576).

The electrode unit described above is produced as follows. At first, an electrode paste is prepared by mixing, for example, an electrode catalyst and an ion-conductive component with an organic solvent for facilitating application. After that, the electrode paste is applied, in accordance with a printing treatment, onto a sheet of carbon paper having been subjected to a water repellent treatment to be used as an electron-conductive catalyst support, or onto an ion exchange membrane. Next, the carbon paper or the ion exchange membrane, on which the electrode paste has been applied, is subjected to a drying treatment so that the organic solvent is removed from the electrode paste and the ion-conductive component is fixed.

However, in the case of the production method described above, the drying treatment is performed, for example, by means of heating with a heater in order to remove, from the electrode paste, the organic solvent for facilitating application. Therefore, the moisture content in the ion-conductive component is excessively lowered, or the state arises in which the moisture content cannot be restored. It is necessary for the ion-conductive component to be always maintained under a constant humidified condition in order to exhibit an effective electric power-generating performance. Therefore, the following problem is pointed out. Namely, the velocity and the ability of ion exchange are significantly lowered if the state arises in which the moisture content in the ion-conductive component cannot be restored. On the other hand, the ion exchange membrane comprises the same component as that of the ion-conductive component. When the ion exchange membrane is subjected to the drying treatment by means of heating with a heater, an inconvenience occurs in that the performance of the ion exchange membrane is lowered.

SUMMARY OF THE INVENTION

The present invention has been made in order to solve the problems as described above, an object of which is to provide a method for producing an electrode unit for a fuel cell, the method making it possible to remove an organic solvent in an electrode paste and fix an ion-conductive component while maintaining a desired moisture content.

In order to achieve the object described above, the present invention provides the following method. Namely, an electrode paste is provided on an electron-conductive catalyst support or on an ion exchange membrane. After that, an organic solvent in the electrode paste is removed, and an ion-conductive component is fixed, while forcedly humidifying the electron-conductive catalyst support or the ion exchange membrane. Accordingly, the ion-conductive component can maintain its moisture content. Thus an obtained fuel cell can exhibit an effective electric power-generating performance.

The humidification is performed in a stream of steam.

Accordingly, it is possible to reliably avoid decrease in the moisture content in the ion-conductive component. Moreover, the stream of steam is directed to a direction substantially perpendicular to the electron-conductive catalyst support or the ion exchange membrane. Therefore, the electron-conductive catalyst support or the ion exchange membrane is uniformly exposed with the stream of steam, and it is possible to obtain an electrode catalyst layer uniformly containing the component over the entire layer. Further, the process is scarcely affected by the temperature distribution which occurs in the direction of the stream in a tank or a housing for carrying out the foregoing process. Thus the temperature distribution scarcely occurs on the electron-conductive catalyst support or the ion exchange membrane. Therefore, an obtained electrode unit is uniform, making it possible to improve the performance. Moreover, it is possible to easily remove organic solvents having a high boiling point, such as ethylene glycol, glycerol, and propylene glycol.

In the present invention, the atmospheric temperature around the electrode paste is increased continuously or in a stepwise manner by the aid of a heating means or the steam itself. Accordingly, the water and the solvent existing in the vicinity of the surface of the electrode paste are prevented from creating bumps. Thus the electrode surface can be maintained to be uniform, and the electrode catalyst layer can be prevented from peeling off and breakage.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
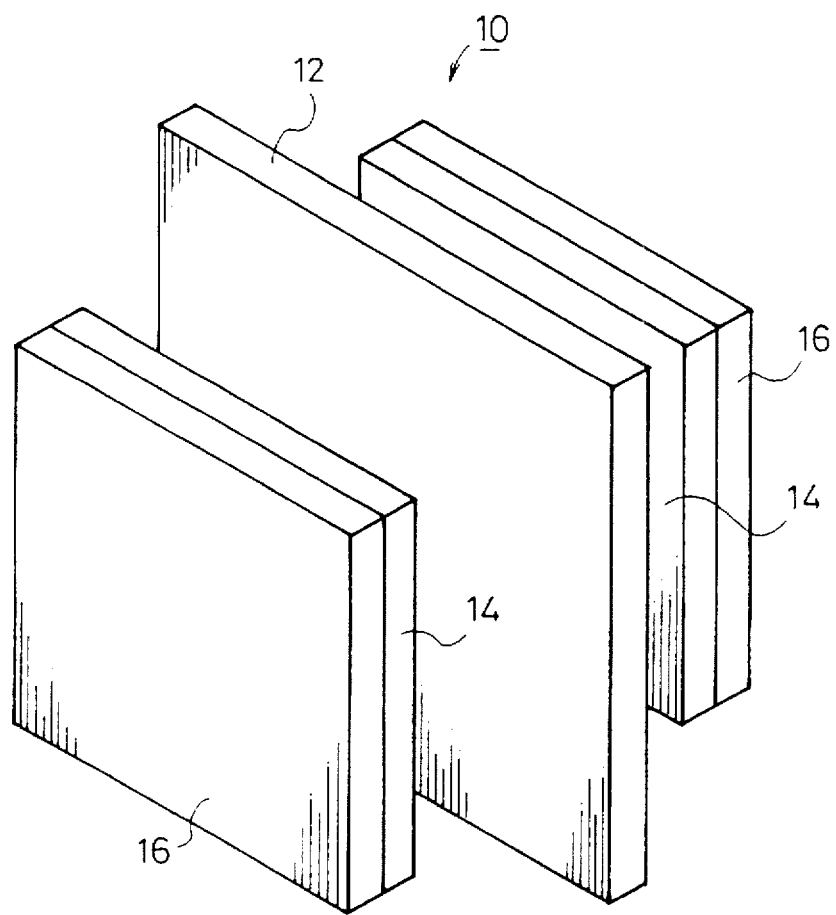
FIG. 1 shows an exploded perspective view illustrating an electrode unit obtained by a production method carried out in accordance with a first embodiment of the present invention.

FIG. 1 shows an exploded perspective view of an electrode unit 10 to which a production method according to a first embodiment of the present invention is applied. The electrode unit 10 comprises an ion exchange membrane 12 and a pair of carbon paper sheets (electron-conductive catalyst supports) 16 each involving an electrode catalyst layer 14 provided thereon by means of, for example, screen printing. For example, carbon felt or sintered porous carbon may be used as the electron-conductive catalyst support in place of the carbon paper 16.

The ion exchange membrane 12 is a cation exchange membrane composed of a perfluoro compound having a sulfonic acid group. Preferably, Nafion is used for the ion exchange membrane or ion-exchanger. The electrode catalyst layer 14 comprises an electrode catalyst such as carbon-supported Pt, an ion-conductive component such as a Nafion solution, and optionally PTFE as a water repellent. The carbon paper 16 serves as a gas diffusion layer having a porous structure. The carbon paper 16 has been previously subjected to a water repellent treatment so that its surface pores are not closed by water.

Figure 2:
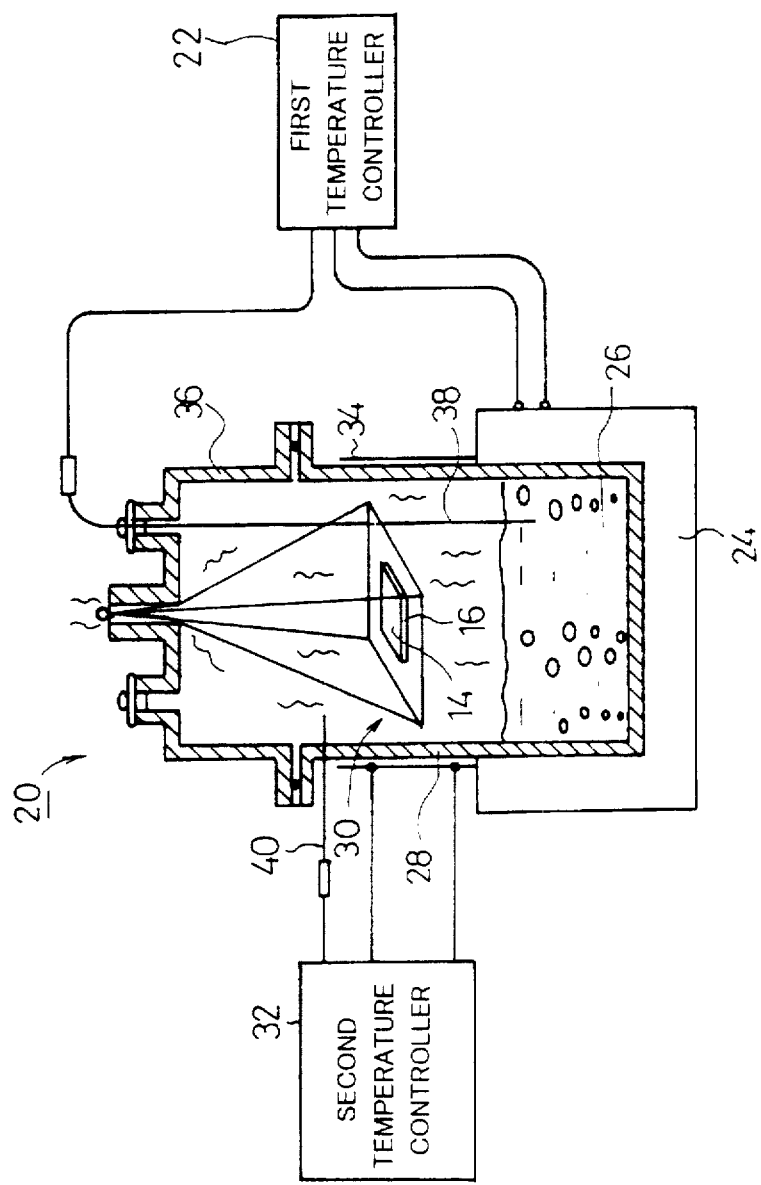
FIG. 2 shows a schematic arrangement of a drying apparatus used for the production method according to the first embodiment.

FIG. 2 shows a drying apparatus 20 for carrying out the production method according to the first embodiment. The drying apparatus 20 comprises a first heater 24 connected to a first temperature controller 22, a tank 28 supported by the first heater 24, for storing water 26 therein, a hanging means 30 for horizontally supporting, in the tank 28, the carbon paper 16 with its printed surface (located on a side of the electrode catalyst layer 14) directed upwardly, a second temperature controller 32 for adjusting an atmospheric temperature in the vicinity of the carbon paper 16 horizontally supported by the hanging means 30, and a second heater (heating means) 34 connected to the second temperature controller 32.

A lid 36 is installed to the top of the tank 28. The lid 36 is provided with the hanging means 30 and a first temperature-detecting means 38 for detecting a temperature of the water. The first temperature-detecting means 38 is connected to the first temperature controller 22. A second temperature-detecting means 40 for detecting the atmospheric temperature in the vicinity of the carbon paper 16 is arranged in the tank 28. The second temperature-detecting means 40 is connected to the second temperature controller 32.

The production method according to the first embodiment of the present invention will be explained below with reference to a process diagram shown in FIG. 3.

At first, an ion-conductive component such as a Nafion solution is mixed with ethylene glycol as an organic solvent for facilitating application, and optionally PTFE as a water repellent (STPA), i.e. Step A. An obtained mixed solution is subjected to fractional distillation to remove low boiling point substances (STPB). An obtained mixed solution after the fractional distillation is mixed with carbon-supported Pt as an electrode catalyst in STPC to prepare a paste for forming an electrode catalyst layer (hereinafter referred to as "electrode paste") (STPD).

On the other hand, a carbon paper sheet 16 has been previously immersed in a PTFE solution to perform a water repellent treatment. The electrode paste is applied onto the carbon paper 16 in accordance with a screen printing method (STPE).

A steam drying treatment (STPF) is applied to the carbon paper 16 on which the electrode paste has been printed in STPE. Namely, the operation is performed in a state in which the water 26 is stored in the tank 28 as shown in FIG. 2. The carbon paper 16 is supported by the lid 36 by the aid of the hanging means 30. The carbon paper 16 is horizontally maintained with the electrode paste surface located upward. Accordingly, humidification is performed in a stream of steam directed to a direction (vertically upwardly) substantially perpendicular to the surface of the carbon paper 16 on which the electrode paste has been applied by the screen printing.

Next, the first heater 24 is operated by the aid of the first temperature controller 22. The water 26 is brought to the boil, and the carbon paper 16 and the electrode paste are forcedly humidified. During this process, the second temperature controller 32 is operated so that the atmospheric temperature around the carbon paper 16 on which the electrode paste has been applied by the screen printing is raised continuously or in a stepwise manner.

In this embodiment, in order to improve the productivity by reliably performing drying in a short period of time, it is preferred to use a high atmospheric temperature around the carbon paper 16. Specifically, the drying velocity is increased when the temperature exceeds 100° C. If the temperature is greater than 120° C., the electrode paste on the carbon paper 16 is damaged. If the temperature is quickly raised, bumps will occur in the vicinity of the surface of the electrode paste on the carbon paper 16, and crater-shaped holes are formed on the electrode surface, resulting in an ununiform surface configuration.

Therefore, the temperature is practically controlled on the basis of three-step control as described below. Namely, a first step is based on temperature control at 100° C.±5° C. for 10 minutes, a second step is based on temperature control at 107° C.±5° C. for 10 minutes, and a third step is based on temperature control at 113° C.±5° C. for 10 minutes.

Accordingly, ethylene glycol in the electrode paste is removed, and the ion-conductive component is fixed while effectively maintaining the moisture content in the ion-conductive component.

The cation exchange membrane (Nafion membrane), which serves as the ion exchange membrane, is subjected to a degreasing treatment in STPG. After that, the cation exchange membrane is integrated with the carbon paper 16 after the steam drying by means of hot press (STPH). Thus the electrode unit 10 is produced.

In the first embodiment, the carbon paper 16 and the electrode paste are forcedly humidified when ethylene glycol, i.e., a high boiling point organic solvent contained in the electrode paste, is removed after the electrode paste is applied to the carbon paper 16.

Accordingly, ethylene glycol is reliably removed from the electrode paste, while the moisture content in the ion-conductive component is effectively maintained, making it possible to prevent the moisture content from decrease or prevent the ion-conductive component from being at an unrecoverable state. Thus it is possible to effectively improve and maintain the electric power-generating performance of the electrode unit 10.

Moreover, the atmospheric temperature around the carbon paper 16 on which the electrode paste is applied by screen printing is raised in a stepwise manner practically based on the three steps under the operation of the second temperature controller 32. Accordingly, an advantage is obtained in that the drying treatment is performed efficiently in a short period of time, and the productivity is effectively improved.

The relationship between the current density and the cell voltage were actually measured by using the electrode unit 10 produced in accordance with the first embodiment. The measurement was performed under an electric power-generating condition in which the cell temperature was set at 75° C., and the pressure on the cell outlet side (operation pressure) was 1 atm.

Figure 3:
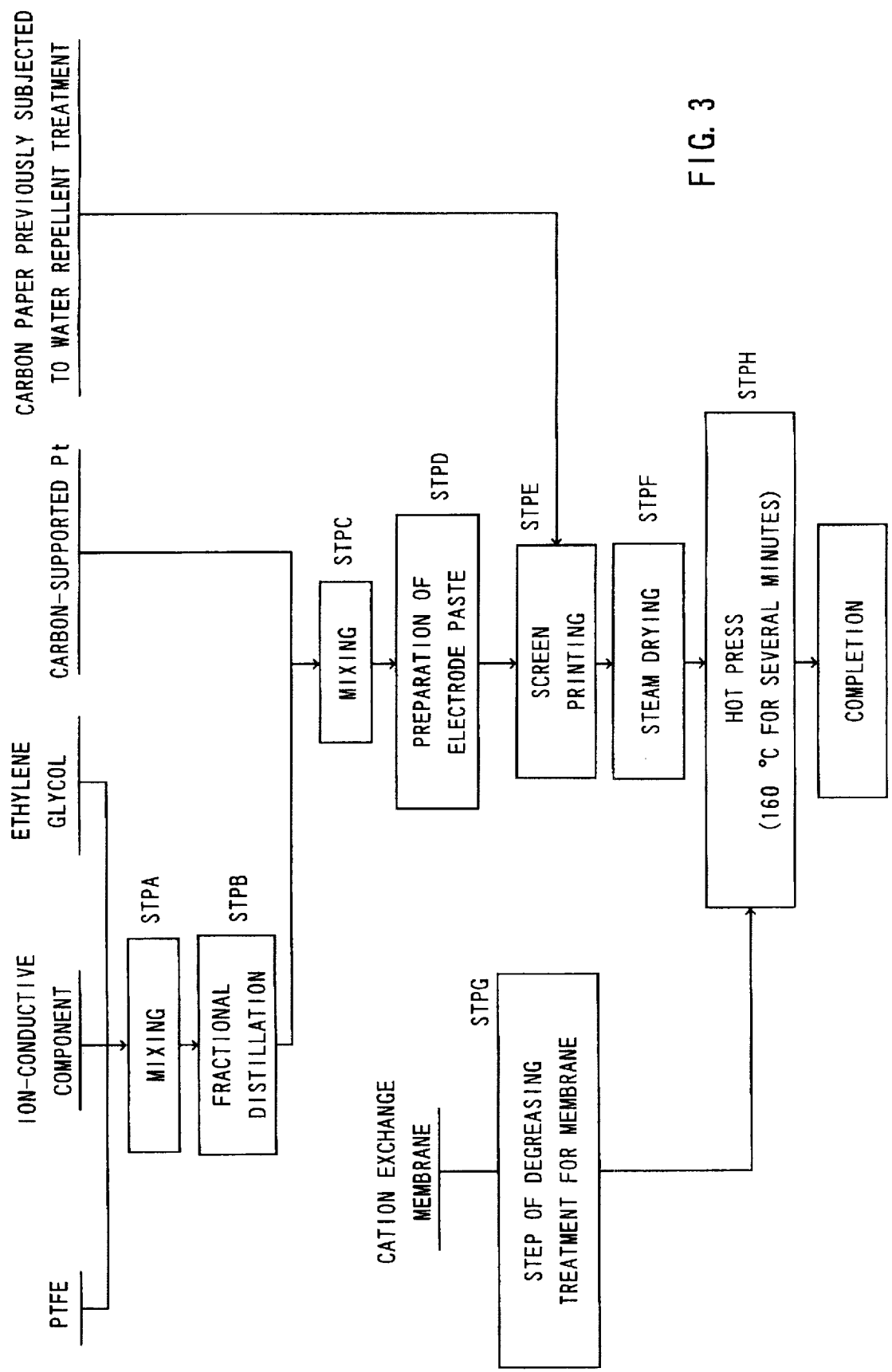
FIG. 3 shows a process diagram adopted in the production method according to the first embodiment.
Figure 4:
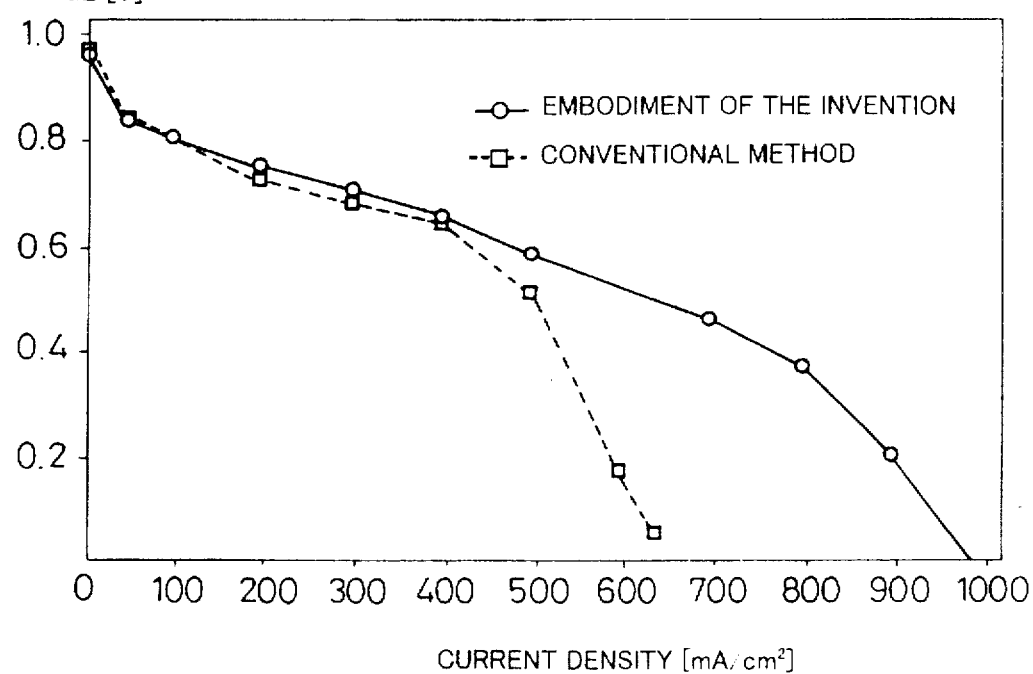
FIG. 4 shows relationships between the current density and the cell voltage, concerning the electrode unit produced by the production method according to the first embodiment and an electrode unit produced by a conventional method.

An obtained result is shown by a solid line in FIG. 4. A broken line in FIG. 4 shows a relationship between the current density and the cell voltage obtained by using an electrode unit produced by a conventional production method. Specifically, in the conventional method, the carbon paper 16 having been subjected to the screen printing in accordance with STPE shown in FIG. 3 was subjected to a drying treatment comprising a period of 30 minutes based on the use of a heater heated to 80° C., followed by a period of 10 minutes based on the use of a heater heated to 100° C., at an atmospheric pressure in dry $N_2$ gas.

In the conventional method, the moisture content in the ion-conductive component was lowered when the organic solvent was removed. As a result, the conventional method brought about portions at which the moisture content was not restored. Therefore, the cell voltage was significantly lowered especially in a region in which the current density was high, and it was impossible to obtain an effective electric power-generating performance. On the contrary, the electrode unit 10 produced in accordance with the first embodiment succeeded in exhibiting an effective electric power-generating performance over an entire region ranging from the low density to the high density.

In the first embodiment, the carbon paper 16 is horizontally maintained by the aid of the hanging means 30 as shown in FIG. 2. Accordingly, the electrode paste components applied on the carbon paper 16 are prevented from ununiform distribution which would be otherwise caused by the influence of the gravity. Thus it is possible to obtain the electrode catalyst layer having the uniform components over the entire layer.

The stream of steam is produced in the vertically upward direction in the state in which the carbon paper 16 is horizontally maintained. Therefore, the stream of steam is directed to the direction substantially perpendicular to the surface of the carbon paper 16. Accordingly, the stream of steam uniformly travels and surrounds the entire carbon paper 16. Moreover, the process is scarcely affected by the temperature distribution generated in the direction of the stream in the tank 28 in which the foregoing steps are carried out, and any temperature distribution is scarcely generated on the carbon paper 16. Therefore, the obtained electrode unit 10 is uniform, and the performance is improved.

The first embodiment has been explained based on the use of ethylene glycol as the organic solvent for facilitating application. However, there is no limitation thereto. The same effect is obtained by using, for example, any one of glycerol, propylene glycol, diethylene glycol, triethylene glycol, and benzyl alcohol.

Next, a production method according to a second embodiment of the present invention will be explained below with reference to a process diagram shown in FIG. 5. Detailed explanation will be omitted for the same parts of the process as those of the first embodiment.

In the second embodiment, the electrode paste is applied by means of the screen printing (STPE') onto the cation exchange membrane having been subjected to the degreasing treatment step (STPG'), i.e., onto the ion exchange membrane 12. Next, the ion exchange membrane 12 applied with the electrode paste is subjected to the steam drying in the same manner as performed in the first embodiment by using the drying apparatus 20 shown in FIG. 2 (STPF').

In this embodiment, Nafion is used as the ion-exchanger for the ion exchange membrane 12 in the same manner as the ion-conductive component. The ion exchange membrane 12 is forcedly humidified during the removal of the organic solvent. Therefore, in the second embodiment, the moisture content in the ion-conductive component is not lowered during the removal of the organic solvent in the same manner as the first embodiment. Further, the moisture content of the ion exchange membrane 12 itself can be effectively maintained. Accordingly, the ion exchange membrane 12 and the ion-conductive component can be maintained in a constant humidified state when an obtained electrode unit 10 is used for a fuel cell, making it possible to exhibit an effective electric power-generating performance.

Figure 6B:
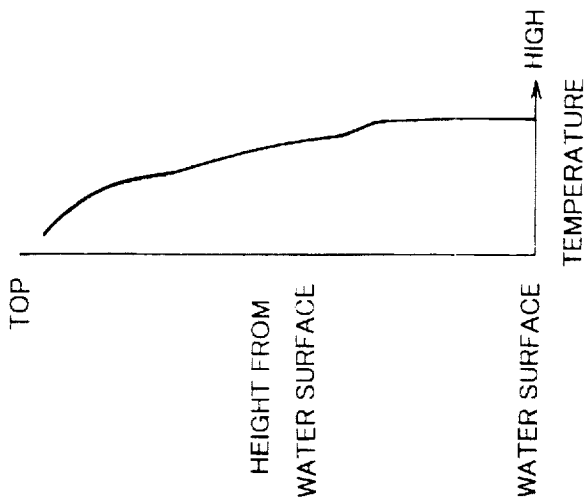
FIG. 6B illustrates the internal temperature distribution in the drying apparatus.
Figure 6A:
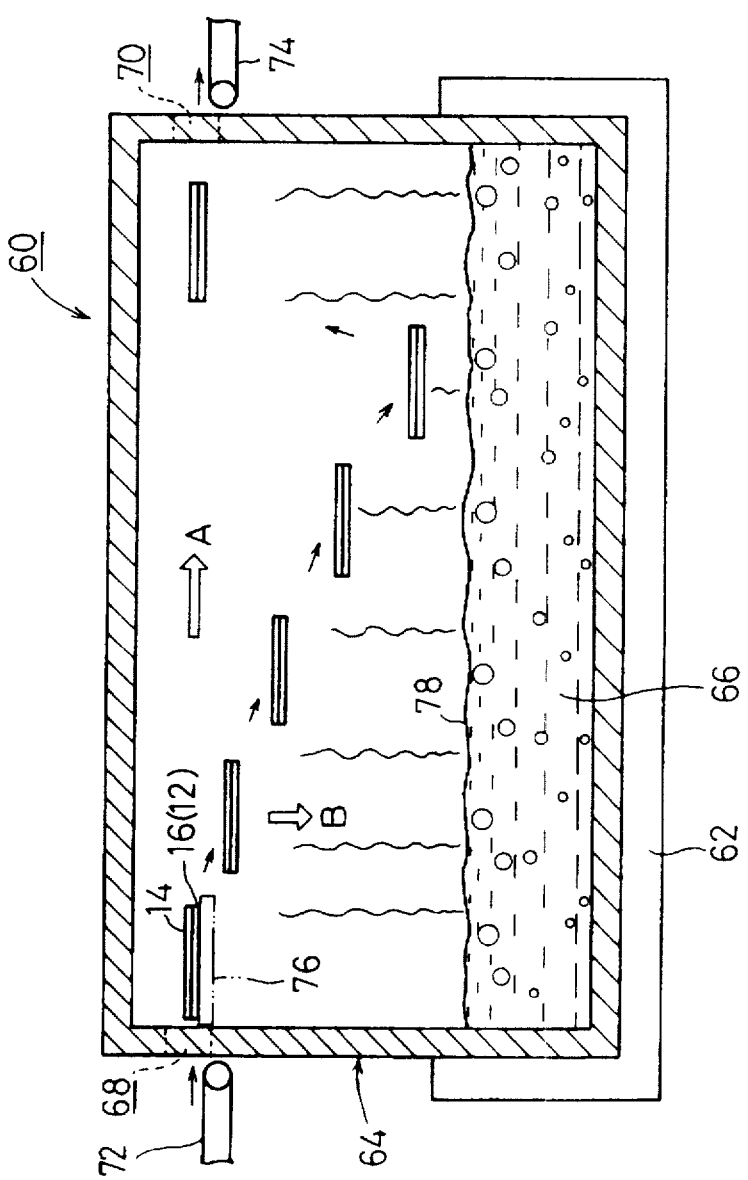
FIG. 6A shows a schematic arrangement of a drying apparatus used for production methods according to third and fourth embodiments of the present invention.

FIG. 6A shows a schematic arrangement of a drying apparatus 60 used to carry out production methods according to third and fourth embodiments of the present invention. The drying apparatus 60 comprises a tank 64 held by a heater 62. Water 66 is stored in the tank 64. The tank 64 is provided, on its both sides, with an inlet port 68 and an outlet port 70 each formed and set at a predetermined position of height. An import conveyer 72 and an export conveyer 74 are arranged in the vicinity of the inlet port 68 and the outlet port 70, respectively.

A transport means 76 is provided in the tank 64, for transporting the carbon paper 16 applied with the electrode paste or the ion exchange membrane 12 applied with the electrode paste, from the inlet port 68 to the outlet port 70. The transport means 76 is operated and controlled such that it is moved in a direction (indicated by an arrow B) to approach the surface 78 of boiling water which generates a stream of steam, while being moved in a direction indicated by an arrow A in the tank 64, and then it is lifted up to the height of the outlet port 70.

The production method according to the third embodiment of the present invention is carried out in accordance with the process shown in FIG. 3 in the same manner as the first embodiment. A steam drying treatment is performed in STPF by using the drying apparatus 60. Namely, as shown in FIG. 6A, at first the carbon paper 16 applied with the electrode paste (by the screen printing) is imported into the tank 64 through the inlet port 68 by the aid of the import conveyer 72, and it is supported on the transport means 76. The water 66 has been brought to the boil in the tank 64 by operating the heater 62. A stream of steam directed vertically upwardly is generated in the tank 64.

The carbon paper 16 applied with the electrode paste is introduced into a position spaced apart by a predetermined distance from the boiling water surface 78 from which the stream of steam is generated. After that, the carbon paper 16 is moved downwardly (in the direction indicated by the arrow B) while being moved in the direction indicated by the arrow A by the aid of operation of the transport means 76. In this embodiment, a relationship as shown in FIG. 6B is given between the atmospheric temperature and the height from the boiling water surface 78.

In the third embodiment, the carbon paper 16 applied with the electrode paste is moved continuously or in a stepwise manner in the direction indicated by the arrow B. Accordingly, the atmospheric temperature around the electrode paste is raised continuously or in a stepwise manner. Therefore, the same effect as that obtained in the first embodiment is obtained. Namely, for example, the electrode surface can be prevented from formation of crater-shaped holes.

In the third embodiment, the carbon paper 16 applied with the electrode paste is imported through the inlet port 68 into the tank 64 by the aid of the import conveyer 72, and then it is exported through the outlet port 70 of the tank 64 by the aid of the export conveyer 74. Accordingly, an advantage is obtained in that the carbon paper 16 applied with the electrode paste can be treated continuously and automatically.

In the third embodiment, the transport means 76 is constructed to make movement in the direction indicated by the arrow A. However, for example, the drying apparatus 20 shown in FIG. 2 may be used, and a transport means capable of making only upward and downward movement may be provided in the drying apparatus 20.

Figure 5:
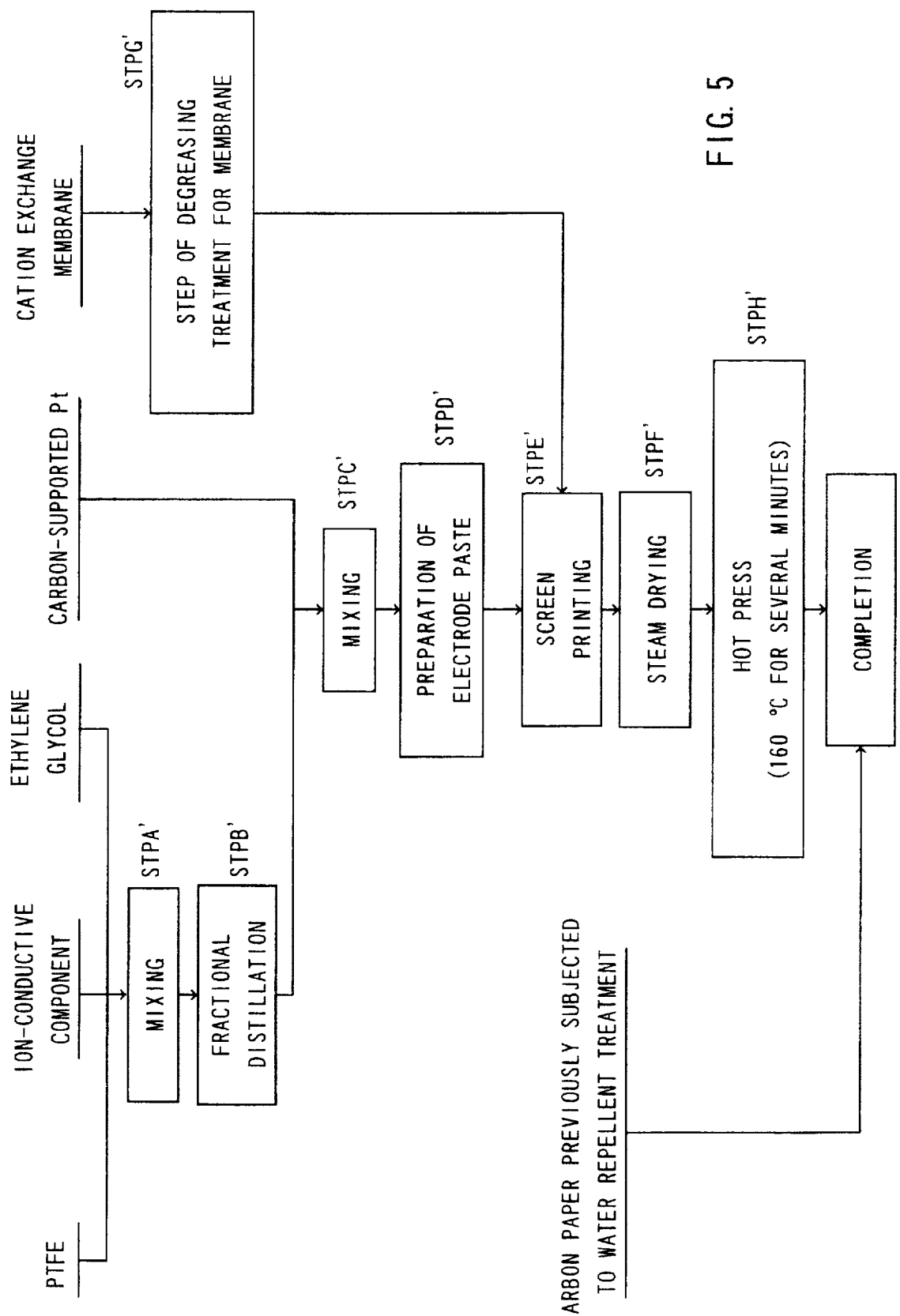
FIG. 5 shows a process diagram adopted in a production method according to a second embodiment of the present invention.

The production method according to the fourth embodiment of the present invention is carried out in accordance with the process shown in FIG. 5 in the same manner as carried out in the second embodiment, provided that the steam drying treatment is performed by using the drying apparatus 60.

Namely, as shown in FIG. 6A, at first the ion exchange membrane 12 applied with the electrode paste (by the screen printing) is imported into the tank 64 through the inlet port 68 by the aid of the import conveyer 72, and it is supported on the transport means 76. After that, the transport means 76 is moved downwardly (in the direction indicated by the arrow B) while being moved in the direction indicated by the arrow A, and then it is moved toward the outlet port 70. Accordingly, the same effect is obtained in the fourth embodiment as that obtained in the second embodiment.

Figure 7:
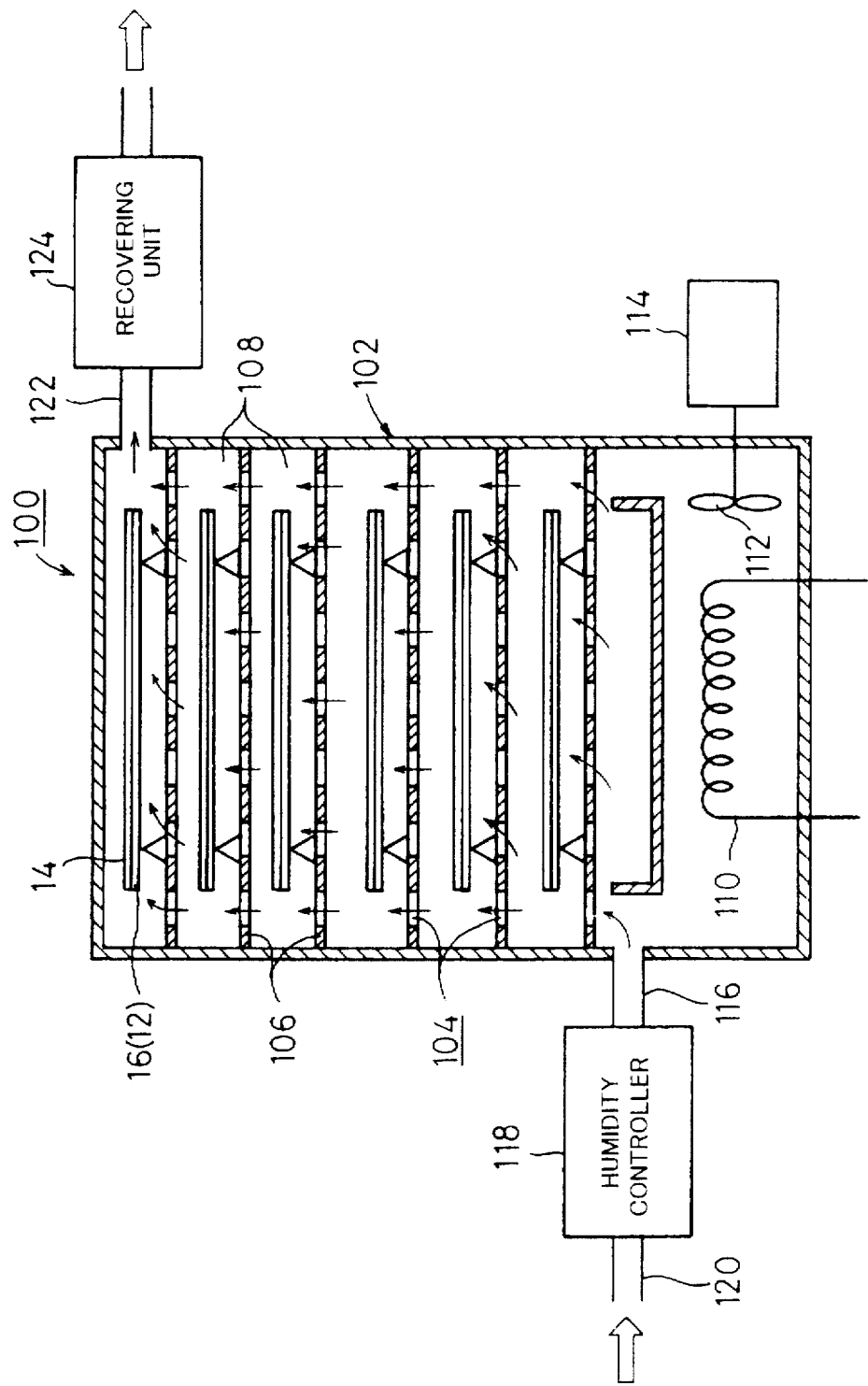
FIG. 7 shows a schematic arrangement of a drying apparatus used for production methods according to fifth and sixth embodiments of the present invention.

FIG. 7 shows a drying apparatus 100 for carrying out production methods according to fifth and sixth embodiments of the present invention. The drying apparatus 100 comprises a drying housing 102. The housing 102 is provided, at its inside, with multiple stages of partition plates 106 having a plurality of inlet holes 104 formed therethrough so that a plurality of placing sections 108 are constructed in a vertically aligned manner. A heater (heating means) 110 is provided at the bottom of the housing 102. A gas-circulating fan 112 is arranged in the vicinity of the heater 110. The gas-circulating fan 112 is rotatable by the aid of a motor 114.

The housing 102 communicates, at its lower side wall surface, with a humidity controller 118 through a tube passage 116. The humidity controller 118 communicates with an unillustrated supply source of carrier gas to be used for drying, through a tube passage 120. The housing 102 is connected, at its upper side wall surface, to a recovering unit 124 for recovering water and solvent, through a tube passage 122. Those adoptable for the humidity controller 118 include those based on various systems such as the gas-bubbling system, the membrane humidifying system, the ultrasonic humidifying system, and the humidifying system based on the use of porous materials.

In the production method according to the fifth embodiment of the present invention, a plurality of the carbon paper sheets 16 applied with the electrode paste are placed in the respective placing sections 108 in the housing 102. After that, the carrier gas, which is adjusted to be in a predetermined humidified state by the aid of the operation of the humidity controller 118, is introduced into the housing 102 through the tube passage 116. The gas-circulating fan 112 is driven by the aid of the motor 114, and the heater 110 is operated so that the temperature in the housing 102 is raised continuously or in a stepwise manner.

Accordingly, the humidified carrier gas passes through the inlet holes 104 of the partition plates 106, and it moves from the bottom to the top of the housing 102. Thus the carbon paper sheets 16 applied with the electrode paste, which are placed in the respective placing section 108, are forcedly humidified. In this process, the temperature in the housing 102 is raised continuously or in a stepwise manner along with the passage of time by the aid of the heater 110. Therefore, bumps do not occur on the surface of the electrode paste and the moisture content in the ion-conductive component can be effectively maintained. Further, more precise control can be performed by optionally controlling the humidity controller 118 so that the humidity in the housing 102 is also adjusted.

In the production method according to the sixth embodiment of the present invention, a plurality of the ion exchange membranes 12 applied with the electrode paste are placed in the respective placing sections 108 in the housing 102 in the same manner as performed in the fifth embodiment. Therefore, the organic solvent can be reliably removed in a state in which the ion exchange membranes 12 are forcedly humidified by the aid of the humidity controller 118 and the heater 110.

In the method for producing the electrode unit for the fuel cell according to the present invention, the electrode paste, which is formed by using the organic solvent and the material for constructing the electrode catalyst layer, is applied onto the electron-conductive catalyst support or onto the ion exchange membrane. After that, the organic solvent is removed, and the ion-conductive component is fixed, while forcedly humidifying the electron-conductive catalyst support or the ion exchange membrane. Accordingly, the ion-conductive component and the ion exchange membrane are prevented from drying, and they are prevented from failure in restoring a desired moisture content. Thus it is possible to exhibit an effective electric power-generating performance by maintaining a predetermined humidified state.

What is claimed is:

1. A method of producing an electrode unit for a fuel cell, comprising the steps of:

providing, on an electron-conductive catalyst support, an electrode paste composed of an organic solvent and an electrode catalyst layer-constructing material containing an electrode catalyst and an ion-conductive component; and removing said organic solvent and fixing said ion-conductive component and said electrode catalyst onto said electron-conductive catalyst support, while disposing said electron-conductive catalyst support provided with said electrode paste thereon in a humidified vapor atmosphere to forcibly humidify said ion-conductive component.

2. The method according to claim 1, wherein said humidification is performed in a stream of steam directed to a direction substantially perpendicular to a surface of said electron-conductive catalyst support provided with said electrode paste thereon.

3. The method according to claim 2, wherein an atmospheric temperature around said electrode paste is raised continuously or in a stepwise manner by using a heating means.

4. The method according to claim 2, wherein an atmospheric temperature around said electrode paste is raised by introducing said electron-conductive catalyst support provided with said electrode paste thereon, into a position spaced apart from a surface of boiling water which generates said stream of steam, and then moving said electron-conductive catalyst support provided with said electrode paste thereon in a direction to approach said surface of boiling water continuously or in a stepwise manner.

5. The method according to claim 2, wherein said electron-conductive catalyst support provided with said electrode paste thereon is arranged in a drying housing, a humidified and adjusted gas is supplied into said drying housing, and a temperature in said drying housing is raised continuously or in a stepwise manner by using a heating means.

6. The method according to claim 1, wherein said organic solvent contains any one of ethylene glycol, glycerol, propylene glycol, diethylene glycol, triethylene glycol, and benzyl alcohol.

7. A method for producing an electrode unit for a fuel cell, comprising the steps of:

providing, on an ion exchange membrane, an electrode paste composed of an organic solvent and an electrode catalyst layer-constructing material containing an electrode catalyst and an ion-conductive component; and removing said organic solvent and fixing said ion-conductive component and said electrode catalyst onto said ion exchange membrane, while disposing said ion exchange membrane provided with said electrode paste thereon in a humidified vapor atmosphere to forcibly humidify said ion-conductive component.

8. The method according to claim 7, wherein said humidification is performed in a stream of steam directed to a direction substantially perpendicular to a surface of said ion exchange membrane provided with said electrode paste thereon.

9. The method according to claim 8, wherein an atmospheric temperature around said electrode paste is raised continuously or in a stepwise manner by using a heating means.

10. The method according to claim 8, wherein an atmospheric temperature around said electrode paste is raised by introducing said ion exchange membrane provided with said electrode paste thereon, into a position spaced apart from a surface of boiling water which generates said stream of steam, and then moving said ion exchange membrane provided with said electrode paste thereon in a direction to approach said surface of boiling water continuously or in a stepwise manner.

11. The method according to claim 8, wherein said ion exchange membrane provided with said electrode paste thereon is arranged in a drying housing, a humidified and adjusted gas is supplied into said drying housing, and a temperature in said drying housing is raised continuously or in a stepwise manner by using a heating means.

12. The method according to claim 7, wherein said organic solvent contains any one of ethylene glycol, glycerol, propylene glycol, diethylene glycol, triethylene glycol, and benzyl alcohol.

* * * * *